(12) United States Patent
Goldberg

(10) Patent No.: US 8,925,003 B2
(45) Date of Patent: Dec. 30, 2014

(54) MECHANISM FOR FACILITATING SYNCHRONIZATION OF AUDIO AND VIDEO BETWEEN MULTIPLE MEDIA DEVICES

(71) Applicant: Silicon Image, Inc., Sunnyvale, CA (US)

(72) Inventor: Marshall Goldberg, Alameda, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 13/791,494

(22) Filed: Mar. 8, 2013

(65) Prior Publication Data

US 2014/0259050 A1    Sep. 11, 2014

(51) Int. Cl.
*H04N 7/10*    (2006.01)
*H04N 21/2368*    (2011.01)

(52) U.S. Cl.
CPC ................ *H04N 21/2368* (2013.01)
USPC ............................. 725/32; 709/231

(58) Field of Classification Search
CPC  H04N 21/812; H04N 21/4331; H04N 21/435
USPC .................... 725/32–36, 78–82, 133, 141; 709/217–232
See application file for complete search history.

(56) References Cited

U.S. PATENT DOCUMENTS

| | | | |
|---|---|---|---|
| 5,040,081 A | 8/1991 | McCutchen | |
| 6,414,960 B1 | 7/2002 | Kuhn et al. | |
| 6,981,059 B1 * | 12/2005 | Philyaw et al. | 709/245 |
| 7,007,166 B1 * | 2/2006 | Moskowitz et al. | 713/176 |
| 7,355,623 B2 * | 4/2008 | Cutler | 348/14.12 |
| 7,362,350 B2 * | 4/2008 | Cutler | 348/14.12 |
| 7,631,088 B2 * | 12/2009 | Logan et al. | 709/228 |
| 8,400,566 B2 * | 3/2013 | Terry et al. | 348/515 |
| 8,600,216 B2 * | 12/2013 | Ramaswamy et al. | 386/246 |
| 8,774,398 B2 * | 7/2014 | Abe et al. | 379/406.01 |
| 2003/0121049 A1 | 6/2003 | Yurt et al. | |
| 2005/0219366 A1 * | 10/2005 | Hollowbush et al. | 348/193 |
| 2006/0195861 A1 | 8/2006 | Lee | |
| 2011/0115977 A1 * | 5/2011 | Simpson et al. | 348/564 |
| 2014/0245339 A1 * | 8/2014 | Zhang et al. | 725/18 |

OTHER PUBLICATIONS

PCT International Search Report and Written Opinion, PCT Application No. PCT/US2014/017460, May 27, 2014, 11 pages.
Radhakrishnan, R. et al., "Audio and Video Signatures for Synchronization," 2008 IEEE International Conference on Multimedia and Expo, (ICME), Apr. 26, 2008-Jun. 23, 2008, pp. 1549-1552.

* cited by examiner

*Primary Examiner* — Annan Shang
(74) *Attorney, Agent, or Firm* — Fenwick & West LLP

(57) ABSTRACT

A mechanism for facilitating dynamic synchronization of audio and video for multiple media devices is described. In one embodiment, an apparatus includes first logic to insert a signature in an audio portion of an audio/video data stream. The signature represents uniquely identifiable data and is to be transmitted to a second media device having a display device. The apparatus may include second logic to detect the signature in the audio portion of the audio/video data stream, third logic to calculate latency of the display device using an audio output of the display device, and fourth logic to synchronize the audio output to a corresponding video display based on a feedback loop generated using the audio portion of the audio/video data stream transmitted to the display device and the audio output of the display device.

18 Claims, 6 Drawing Sheets

MECHANISM FOR FACILITATING SYNCHRONIZATION OF AUDIO AND VIDEO BETWEEN MULTIPLE MEDIA DEVICES

TECHNICAL FIELD

Embodiments of the invention generally relate to media communication and, more particularly, to a mechanism for facilitating synchronization of audio and video between multiple media devices.

BACKGROUND

Over years, the consumer electronics industry has made several attempts to synchronize audio and video being communicated between and emitted from multiple media devices to enhance user (e.g., listeners, viewers, etc.) experience and pleasure. Typically, each device in the chain of audio/video creation and transmission has an audio/video synchronization mechanism, from recording through editing, transmission, reception, and up to the final rendering of the audio and video. However, these attempts have failed to effectively deal with certain issues and/or take into account various limitations relating to audio/video synchronization when audio and video are rendered by independent devices, particularly because of the variable delay imparted by the display device (typically a television). For example, one conventional technique used in home theater is to allow user-adjustable audio delay settings in an amplifier or speaker device, which adjust audio delay until the audio is synchronized with the video output by the video display device. However, this technique is not only inefficient and laborious (requiring adjustment "by eye"), but also ineffective because the variable nature of television latency causes miscalibration and currently no effective synchronization mechanism exists between the separate audio and video rendering devices.

SUMMARY

A mechanism for facilitating synchronization of audio and video for multiple media devices.

In one embodiment, an apparatus includes first logic to insert a signature into an audio portion of an audio/video data stream. The signature represents uniquely identifiable data and is to be transmitted to a second media device having a display device, such as a television. The apparatus may include second logic to detect the signature in the audio portion of the audio/video data stream, third logic to calculate latency of the display device using an audio output of the display device, and fourth logic to synchronize the audio output to a corresponding video display based on a feedback loop generated using the audio portion of the audio/video data stream transmitted to the display device and the audio output of the display device.

In one embodiment, a system includes a computing device having a memory to store instructions, and a processing device to execute the instructions, wherein the instructions cause the processing device to insert a signature into an audio portion of an audio/video data stream. The signature represents uniquely identifiable data and is to be transmitted to a second media device having a display device, such as a television. The processing device may subsequently detect the signature contained in the audio portion of the audio/video data stream which is output from the display device, use this data to calculate latency of the display device, and synchronize the audio output to a corresponding audio rendering device based on a feedback loop generated using the audio portion of the audio/video data stream transmitted to the display device and the audio output of the display device.

In one embodiment, a method includes inserting a signature in an audio portion of an audio/video data stream. The signature represents uniquely identifiable data and is to be transmitted to a second media device having a display device. The method may include detecting the signature in the audio portion of the audio/video data stream, calculating latency of the display device using an audio output of the display device, and synchronizing the audio output to a corresponding video display based on a feedback loop generated using the audio portion of the audio/video data stream transmitted to the display device and the audio output of the display device.

In one embodiment, an apparatus capable of receiving an audio/video data stream wirelessly includes logic for inserting a signature into an audio portion of the audio/video data stream. The signature represents uniquely identifiable data and is to be transmitted with the audio/video data to an internal sub-system or to a second media device having a display device. The apparatus includes secondary logic capable of receiving audio output from the second media device or internal sub-system, logic which detects the signature contained with this audio, and logic which calculates the amount of time elapsed since the signature was transmitted to the second display and received back from the display device. The resulting data, referred to as latency data, and expressed as a unit of time or a measure from which time can be derived, is transmitted back to the originating radio transmitter, which in turn is a second apparatus which decodes this signal and makes the latency data available to the upstream device or sub-system which provided the audio-video data stream. The upstream device or sub-system thusly receives and uses the latency data to synchronize the output of audio to one or more internal or external amplifiers and/or loudspeakers.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are directed to facilitating synchronization of audio and video between multiple media devices.

In one embodiment, dynamic audio/video ("AV") synchronization mechanism is inexpensively implemented on to any number and type of consumer electronics products without changing how such products are designed by their manufacturers or used by consumers. In one embodiment, the dynamic audio/video synchronization mechanism facilitates accurate, dynamic, and timely synchronization of audio and video between two or more media devices but is employed at merely a single media device.

Figure 1:
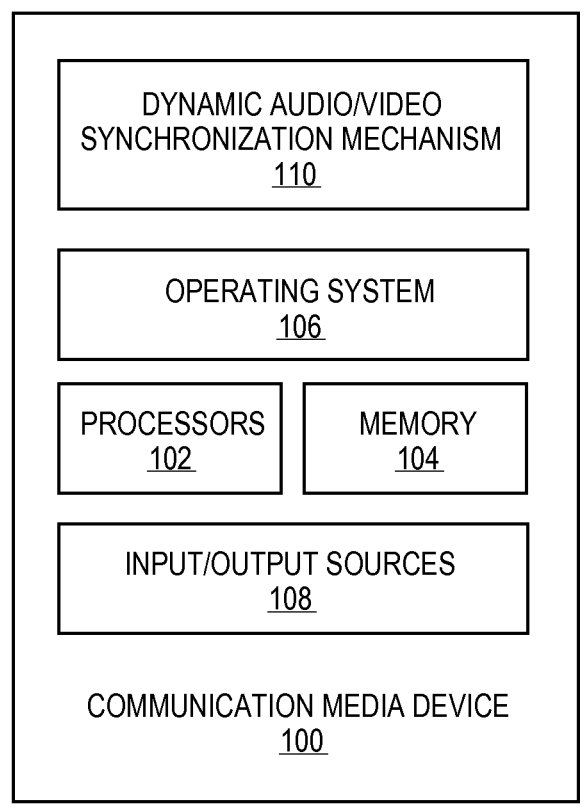
FIG. 1 illustrates a media device employing a dynamic audio/video synchronization mechanism according to one embodiment.

FIG. 1 illustrates a media device employing a dynamic audio/video synchronization mechanism according to one embodiment. Communication or network media device 100 may include any number and type of media devices, such as an amplifier, an AV receiver, or the like. Further, the communication media device 100 may include any number of components and/or modules that may be common to a variety of media devices (such as an amplifier, a sink device, a source device, etc.); however, throughout this document and particularly with reference to FIG. 2, in one embodiment and for brevity, clarity and ease of understanding, the communication media device 100 includes and may be referred to as an amplifier or an AV receiver employing the dynamic AV synchronization mechanism ("AV mechanism") 110 and set to be in communication with one or more source devices and one or more sink device over a network (e.g., a broadcasting network, such a cable or satellite broadcasting network, a Wide Area Network (WAN), a Local Area Network (LAN), a Personal Area Network (PAN), a Metropolitan Area Network (MAN), an intranet, the Internet, etc.).

A source device refers to a transmitter or a transmitting device that is responsible for transmitting data (e.g., media audio and/or video data/content streams) to a sink device that refers to a receiver or a receiving device responsible for receiving the transmitted data over a communication network. Examples of a source device may include consumer electronics devices, such as a personal computer ("PC"), a mobile computing device (e.g., a tablet computer, a smartphone, etc.), an MP3 player, an audio equipment, a television, a radio, a Global Positioning System ("GPS") or navigation device, a digital camera, an audio/video recorder, a Blu-Ray player, a Digital Versatile Disk ("DVD") player, a Compact Disk ("CD") player, a Video Cassette Recorder ("VCR"), a camcorder, etc. Examples of a source device may further include a computing device, a data terminal, a machine (e.g., a facsimile machine, a telephone, etc.), a video camera, a broadcasting station (e.g., a television or radio station, a cable headend, etc.), a cable broadcasting head-end, a set-top box, a satellite, etc. A sink device may include one or more of the same examples of media devices as those listed for the source device.

Communication media device 100 may include an operating system 106 serving as an interface between any hardware or physical resources of the source device 100 and a sink device or a user. Communication media device 100 may further include one or more processors 102, memory devices 104, network devices, drivers, or the like, as well as input/output ("I/O") sources 108, such as a touchscreen, a touch panel, a touch pad, a virtual or regular keyboard, a virtual or regular mouse, etc.

Figure 2:
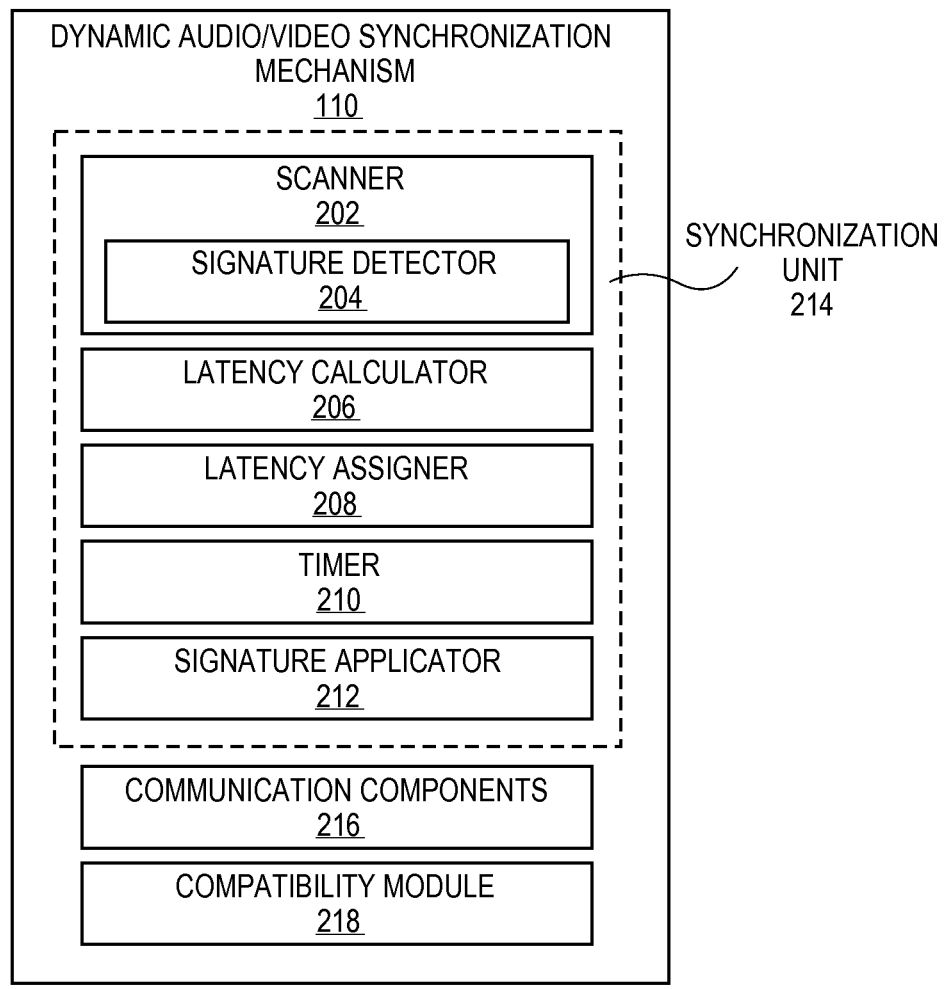
FIG. 2 illustrates a dynamic audio/video synchronization mechanism according to one embodiment.

FIG. 2 illustrates a dynamic audio/video synchronization mechanism according to one embodiment. In one embodiment, the AV mechanism 110 includes a number of components, such as a synchronization unit 214 having a scanner 202 (further having a signature detector 204), a latency calculator 206, a latency assigner 208, a timer 210, and a signature applicator 212. The AV mechanism 110 further includes communication components 216 and a compatibility module 218. Throughout this document, the various components 202-218 of AV mechanism 110 may be interchangeably referred to as "logic", "processing logic", or "module" and may include, by way of example, software, hardware, and/or any combination of software and hardware, such as firmware.

In one embodiment, an amplifier or an AV receiver, employing the AV mechanism 110, receives an audio input from a sink device, such as a television, through a feedback loop using one or more communication components 216 to work with certain default components (such as receivers, transmitters, etc., that are typically employed at various media devices) having, for example, the Audio Return Channel ("ARC") feature of the High-Definition Multimedia Interface ("HDMI") Specification 1.4, also known as an HDMI-ARC. For example, for older televisions, a connection may be made by attaching the analog or digital audio output of a television to the audio input of an amplifier. A sink device, such as a television, may employ an optical digital output connector (e.g., Toshiba Link ("TOSLINK")) which creates the aforementioned feedback loop between a couple of media devices, such as between a television and an amplifier.

Using the HDMI, the amplifier may transmit audio along with a video signal to the television. This may occur even when the input audio format is multi-channel. When transmitting the audio and video, the AV mechanism 110 at the amplifier may buffer a small sample of the audio, such as 20 bytes or any amount determined to be sufficient to create a statistically unique "signature". The timer 210 may then be started, while the audio/video signal is then sent to the television, which by its design ensures that the audio and video are synchronized. The audio that is subsequently outputted from the television over its audio output connector (e.g., TOSLINK, Sony/Phillips Digital Interconnect Format ("S/PDIF"), HDMI-ARC, etc.) is synchronized with the corresponding video signal. It is to be noted and appreciated that any reference to "amplifier", "television" and other similar media devices is made as an example to promote brevity, clarity and ease of understanding and that embodiments of the invention are not limited to a particular type, brand, or number of media devices and/or their components.

In one embodiment, the scanner 202, using the signature detector 204, scans the incoming audio signal from the television to determine when a previously-buffered audio "signature" is received. Once the signature data is received and detected by the signature detector 204, the current time is compared to the time set by the timer 210 when the content was transmitted and thus, providing an accurate indication of the television's latency at that moment. The latency calculator 206 calculates a latency value, while the latency assigner 208 assigns the latency value to the output audio and synchronizing it with the output video. It is contemplated that latency calculator may take into account other latency factors at this point, such as the latency of the audio decompression, the processing circuitry, the size of the room, etc.

In another embodiment, instead of buffering a sample, the AV mechanism 110 at the amplifier injects a timed signature into a data stream, such as a stereo audio output, which can then be read back more effectively by the amplifier or any other receiver at, for example, any display device associated with the sink device. While this data stream may appear to be a stereo digital audio, it may not actually be such. This approach provides better accuracy of signature "hits" between the amplifier and the display device of a sink device (e.g., television). In one embodiment, the timer 210 and the signature applicator 212 of the synchronization unit 214 are used to calculate the timed signature and apply it to the data stream.

Communication components 216 are used to facilitate communication between various media devices, such as a source device, a sink device, and an amplifier or AV receiver employing the AV mechanism 110. Communication components 216 further provide various modules to facilitate communication between various components of the AV mechanism 110 as well as with and through certain default communication components (such as a receiver, a transmitter, processors, loud speakers, I/O components, buffers, and the like) that are part of various media devices. Further, a violation at a system level may be detected by disabling the audio return feature or disconnecting the audio output of a device containing the display, such as a television, and thereafter, in response, observing the change in audio synchronization. In this case, if a change in audio synchronization is detected, it can be concluded that the sink device or the system is in violation.

In one embodiment, the AV mechanism 110: (1) works automatically, without user intervention; (2) works dynamically, locking in the audio being broadcast from the amplifier (employing the AV mechanism 110) with the video output being displayed at the sink device, such as a television, ensuring that the television's variable latency is correctly tracked and corrected, if necessary, by the AV mechanism 110 at the amplifier; (3) can be employed at a single media device, such as an amplifier or an AV receiver, so that a consumer may purchase a single media device that can solve the synchronization problem without having to replace multiple components or media devices; (4) is compatible with any number and type of media devices, such as Blu-ray players, DVD players, game consoles, etc., using its compatibility module 216; (5) is inexpensive and simple to implement; and (6) allows the consumer to attach and use their entertainment equipment without having to change their current connections, settings, or the like.

AV mechanism 110, using its compatibility module 218, is not limited to any particular number or type of media devices (sink device, source device, etc.) or technology or components or equipment, such as receivers, transmitters, displays, wires, connections, audio/video types, the amount of latency, and the like. For example, although TOSLINK is mentioned for brevity and as an example throughout this document, the AV mechanism 110 is not limited to TOSLINK or any other audio signals or connections mentioned in this document. It is contemplated that some televisions, for example, can only output uncompressed stereo, Pulse-Code Modulation ("PCM"), and compressed Dolby® Digital audio, but not the more desirable High Bitrate Audio formats, which are used in Blu-ray and other content types. Currently, these formats include uncompressed multi-channel audio, Dolby TrueHD, and DTS-HD™ Master audio, etc. Further, many home theater enthusiasts prefer the connectivity model of using the amplifier as a switching device and attaching a single cable between the amplifier and the television. The amplifier may have audio signal processing features which may add latency and so, using the AV mechanism 100, such latency is also considered and the audio and video are synchronized in a controlled fashion. It is contemplated that the AV mechanism 110 is compatible with any of these audio/video formats, audio and video signal types, hardware, connections, software, and the like.

Figure 3A:
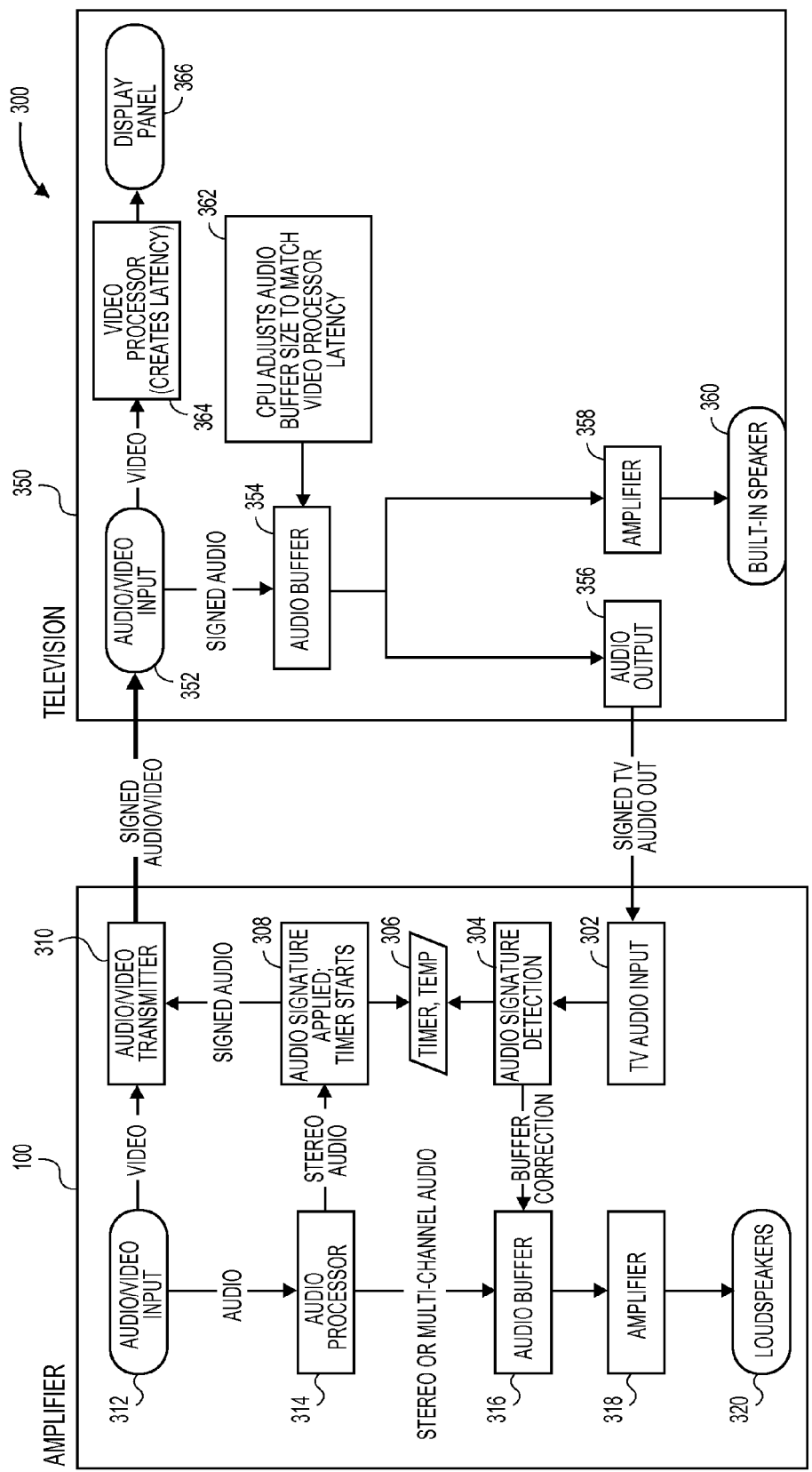
FIG. 3A illustrates a transaction sequence for audio/video synchronization using a dynamic audio/video synchronization mechanism according to one embodiment.

FIG. 3A illustrates a transaction sequence for audio/video synchronization using a dynamic audio/video synchronization mechanism according to one embodiment. In one embodiment, a transaction sequence 300 to synchronize audio and video between various media devices, such as an amplifier 100 broadcasting the audio and a source device, such as a television 350, displaying the video. In the illustrated embodiment, the amplifier 100 (that plays audio and transmits video), employing the AV mechanism of FIGS. 1-2, is coupled to a source device (that transmits audio and video), now shown here, and a sink device (that plays video), such as the illustrated television 350.

It is commonly accepted to attach a TOSLINK optical audio cable from the television to the amplifier 100, which allows the amplifier 100 to play audio which originates from the television 350, such as an over-the-air TV broadcast. Some new televisions 350 may include a newer feature of HDMI 1.4 known as HDMI-ARC or simply ARC, which embeds the TOSLINK audio output signal from the television 350 onto one or two pins inside an HDMI cable, thereby eliminating the need for a separate cable. Televisions 350 with ARC support continue to offer a separate TOSLINK audio output, for compatibility with legacy amplifiers 100.

A typical television 350 imparts latency of approximately 3 to 500 milliseconds from the time of receiving an input signal until the image is rendered on a display screen. This latency time may vary depending upon one or more of the television model, the format of the incoming video, and television preference settings made by the consumer. In one embodiment, since the amplifier 100 or AV receiver, which is typically attached upstream of the television 350, and may not know how much latency the television 100 imparts on its video output at any given time, the AV mechanism with its various components, as discussed with reference to FIG. 2, provide a novel technique to calculate the latency and apply it to the data stream to synchronize the audio being emitted by the amplifier 100 with the video being displayed by the television 100 and thus, eliminating the distraction and unpleasant entertainment experience for the consumer.

The amplifier 100, via an audio/video input 312, receives content (e.g., audio/video data stream) from a source device, such as a Blu-ray player. The amplifier processes the content using its audio processor 314, audio buffer 316, and an amplifier 318. The processed content is then sent as an output to its speakers 320. Simultaneously, the amplifier 100 converts, if necessary, the audio content into PCM stereo audio and transmits, via an audio/video transmitter 310, the PCM stereo audio to the television 350 in an HDMI signal along with the video content of the data stream. In one embodiment, using the AV mechanism, the stereo audio is time-stamped and buffered before being transmitted to the television 350, as detailed below. The audio signature is applied by signature applicator 308, which resets timer 306 to zero. The timer increments until the signature returns.

The television 350, via its audio/video input 352, receives the audio/video content from the amplifier 100 via its audio/video transmitter 310. The television 350 outputs synchronized audio via a cable, such as a TOSLINK, an HDMI-ARC, etc., connected to the amplifier 100. At the television, the audio of the received, signed audio/video content is sent and processed through an audio buffer 354 and subsequently through the audio output 356, the amplifier 358 and the built-in speaker 360 of the television 350. The amplifier 100 receives, via the TV audio input 302, the TOSLINK/HDMI-ARC, etc., audio data from the television 350. At the amplifier 100, the AV mechanism, using the scanner 202 and signature detector 204 as referenced in FIG. 2, scans and detects the audio signature 304 of the received TONSLINK/HDMI-ARC, etc., audio data, and checks the accumulated value in timer 306 to determine the latency of television 350, as will be described below.

In one embodiment, the amplifier's AV mechanism, using its latency calculator 204 and latency assigner 208 as referenced in FIG. 2, calculates the latency value, while subtracting its own system latency values (e.g., latency of audio decoding, effects of processing, amplifier-to-speaker signal transmission, etc.). The amplifier 100 buffers its audio before outputting to the speakers 320 by the amount compared in the previous process, including any buffer correction, if necessary. Further, to prevent any audio noise, the amplifier 100 may temporarily modify the pitch of the audio until synchronization is achieved. The audio is synchronized with the video and the amplifier-television feedback loop continues the synchronization operation. Each time a latency value is determined, the AV mechanism of the amplifier 100 continues to modify its latency so as to re-process and re-achieve synchronization between the audio and video. In one embodiment, at the television 350, the video of the received audio/video content is processed through a video processor 364 (that can create latency), while the Central Processing Unit (CPU) of the television 350 adjusts the audio buffer 354 to match the video processor latency 362. The display panel 366 of the television 350 is used to display the video content.

At the amplifier 100, the signature application of audio before its transmission to the television 350 can be performed in several ways. For example and in one embodiment, the amplifier 100 may store several bytes of the digital audio content in the audio buffer 316, start a counter, and compare the incoming audio stream received via television audio input 302 to the buffered audio data until a "hit" is achieved. When a hit occurs, the value in the counter indicates the amount of latency. The audio buffer 316 is then adjusted as necessary, and the comparison begins again and repeating continuously, as necessitated or desired. The amount and size of the buffer 316 can be computed and optimized through computation or experimentation with audio data.

In another embodiment, the audio data is looked at as a data stream of, for example, 16-bit numbers, and the least significant bits are encoded as values which can be detected in the feedback loop. A 16-bit audio sample contains a value between 0 and 65,535. Manipulating the least significant bit maintains audio fidelity, while providing an area to create a unique code or timestamp. This can be implemented in a variety of ways; for example, eight samples can be encoded as a marker, such as 01010101, followed by an eight-bit counter, which is incremented continuously, or the marker can be transmitted once per second or in some other reasonable interval.

In another embodiment, the audio data is treated as sound, and the signature is applied by 308 as a sequence of audio frequency pulses, which can be detected by 304 irrespective of any signal modifications which may be imparted by device 350. This signature can be injected as a replacement of the original audio or it can be injected into the original audio stream so as to be inaudible or barely audible.

In one embodiment, the AV mechanism may be implemented within an audio-video switching device, such as an HDMI semiconductor, of the amplifier 100. This way, for example, the incremental cost of implementing the AV mechanism can be kept extremely low, such as employing a few buffers, a counter, and an I2C-accessible register which holds the computed latency value.

Figure 3B:
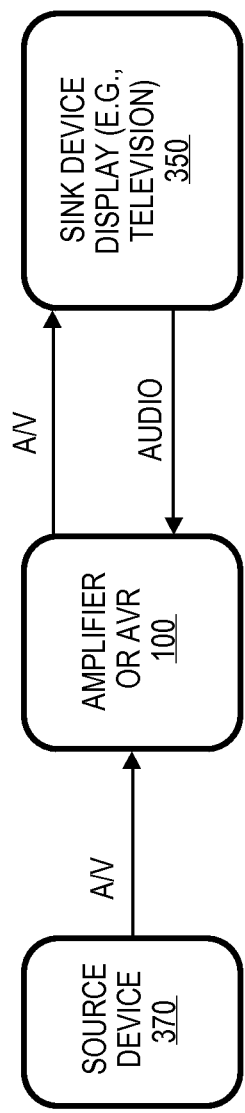
FIG. 3B illustrates a transaction sequence for wired-based audio/video synchronization using a dynamic audio/video synchronization mechanism according to one embodiment.

FIG. 3B illustrates a transaction sequence for wired-based audio/video synchronization using a dynamic audio/video synchronization mechanism according to one embodiment. In a wired use case, various devices, such as a source device 370, an amplifier or AVR 100, a sink device 350, such as a television display device, may be wired connected. In one embodiment, when wired connected, various aforementioned processes, such as insertion or application of a signature, detection of a signature, calculation of latency, etc., may be performed at the amplifier/AVR 100.

Figure 3C:
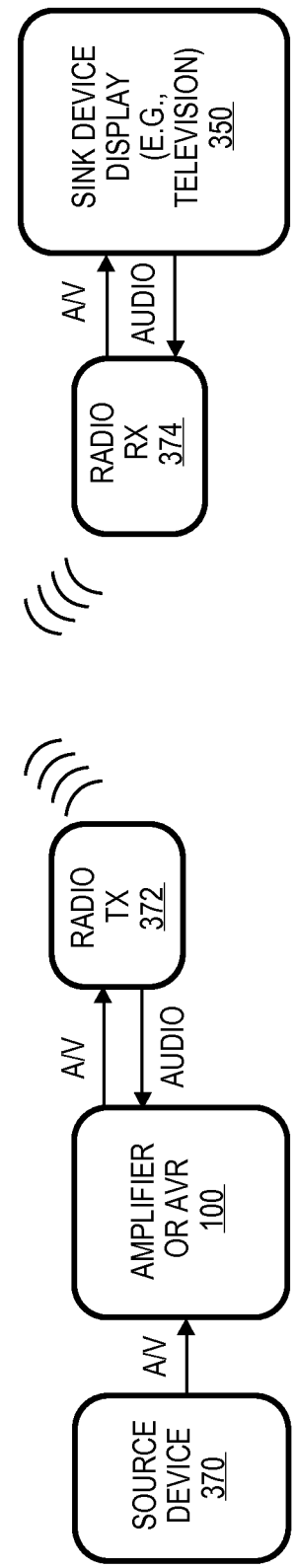
FIG. 3C illustrates a transaction sequence for wireless-based audio/video synchronization using a dynamic audio/video synchronization mechanism according to one embodiment.

FIG. 3C illustrates a transaction sequence for wireless-based audio/video synchronization using a dynamic audio/video synchronization mechanism according to one embodiment. In a wireless use case, one or more of a source device 370, an amplifier or AVR 100, a sink device 350, such as a television display device, may be wired or wirelessly connected. For example and as illustrated, the amplifier/AVR 100 and the display device 350 are wireless connected and in communication with each other through a radio transmitter 372 (associated with the amplifier/AVR 100) and a radio receiver 374 (associated with the display device 350). In one embodiment, when wirelessly connected, various aforementioned processes, such as insertion or application of a signature, detection of a signature, calculation of latency, etc., may be performed at the amplifier/AVR 100, while various data streams may be transported wirelessly working with any number and type of wireless transports.

In another embodiment, when wirelessly connected, various aforementioned processes, such as insertion or application of a signature, detection of a signature, calculation of latency, etc., may be performed at the radio receiver 374, while the radio receiver 374 may also be used to compensate any potential or occurring latency.

Figure 4:
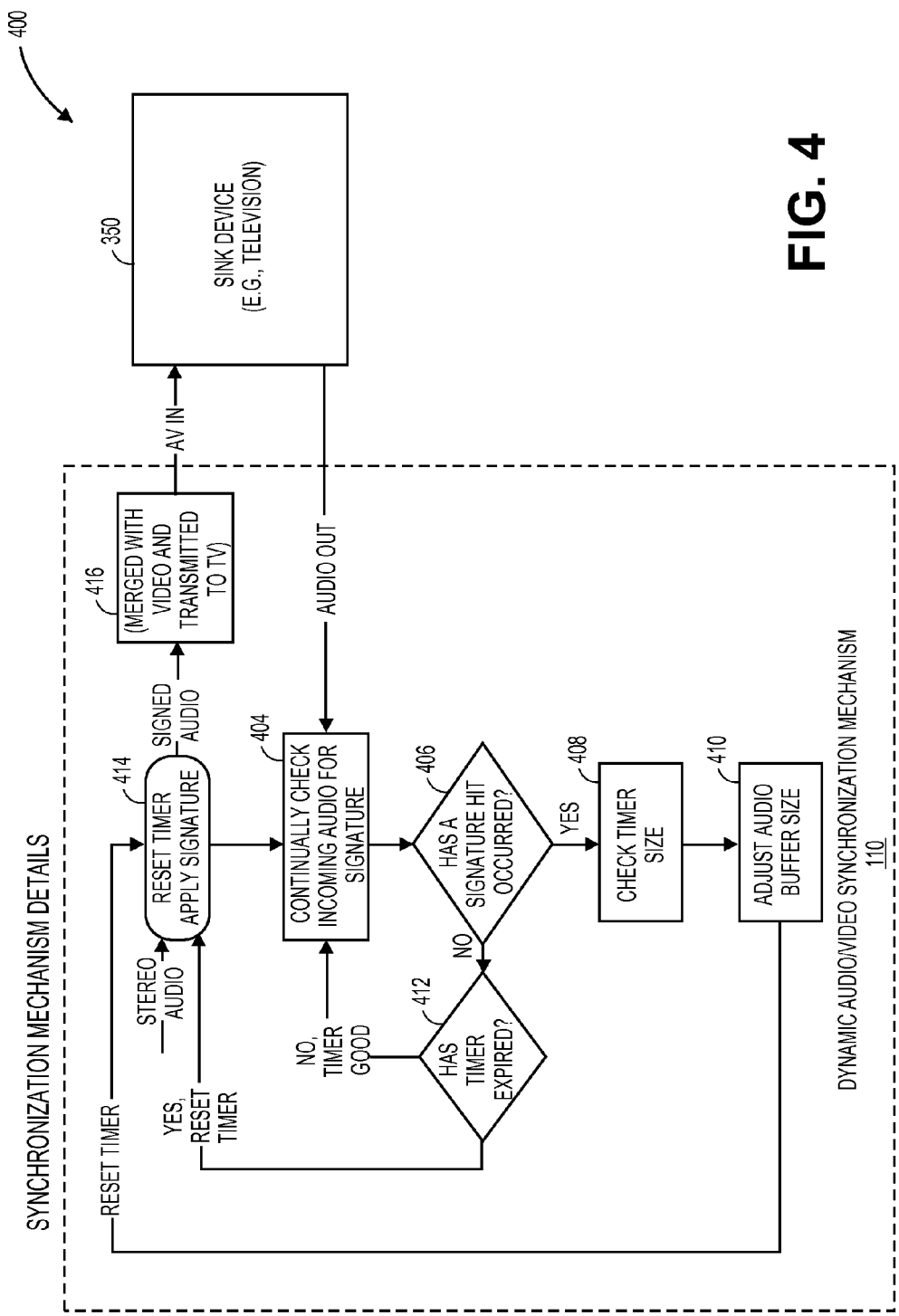
FIG. 4 illustrates a process for audio/video synchronization using a dynamic audio/video synchronization mechanism according to one embodiment.

FIG. 4 illustrates a process for audio/video synchronization using a dynamic audio/video synchronization mechanism according to one embodiment. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by the dynamic audio/video synchronization mechanism 110 of FIG. 1.

Method 400 begins with a sink device 350, such as a television, transmitting out audio that is received at the AV mechanism 110 employed at a media device, such as an amplifier. At block 404, the received or incoming audio is continually scanned and checked for a signature. At block 406, a determination is made as to whether a signature hit has occurred or, in other words, whether the incoming audio includes a signature. If yes, at block 408, the signature's timer size is checked. At block 410, the audio buffer at the amplifier is adjusted for its size.

Referring back to block 406, if a signature is not detected, at block 412, another determination is made as to whether the timer has expired. If not, then the timer is considered good, and the process continues with checking of the incoming audio for signature at block 404. If yes, then the process continues with resetting of the timer and application of a signature to the stereo audio at block 414. At block 416, the signed audio is sent on to be merged with the corresponding video and then transmitted on to the television 350. Referring back to block 410, once the audio buffer size is adjusted, the timer is reset and the process continues at block 414.

Figure 5:
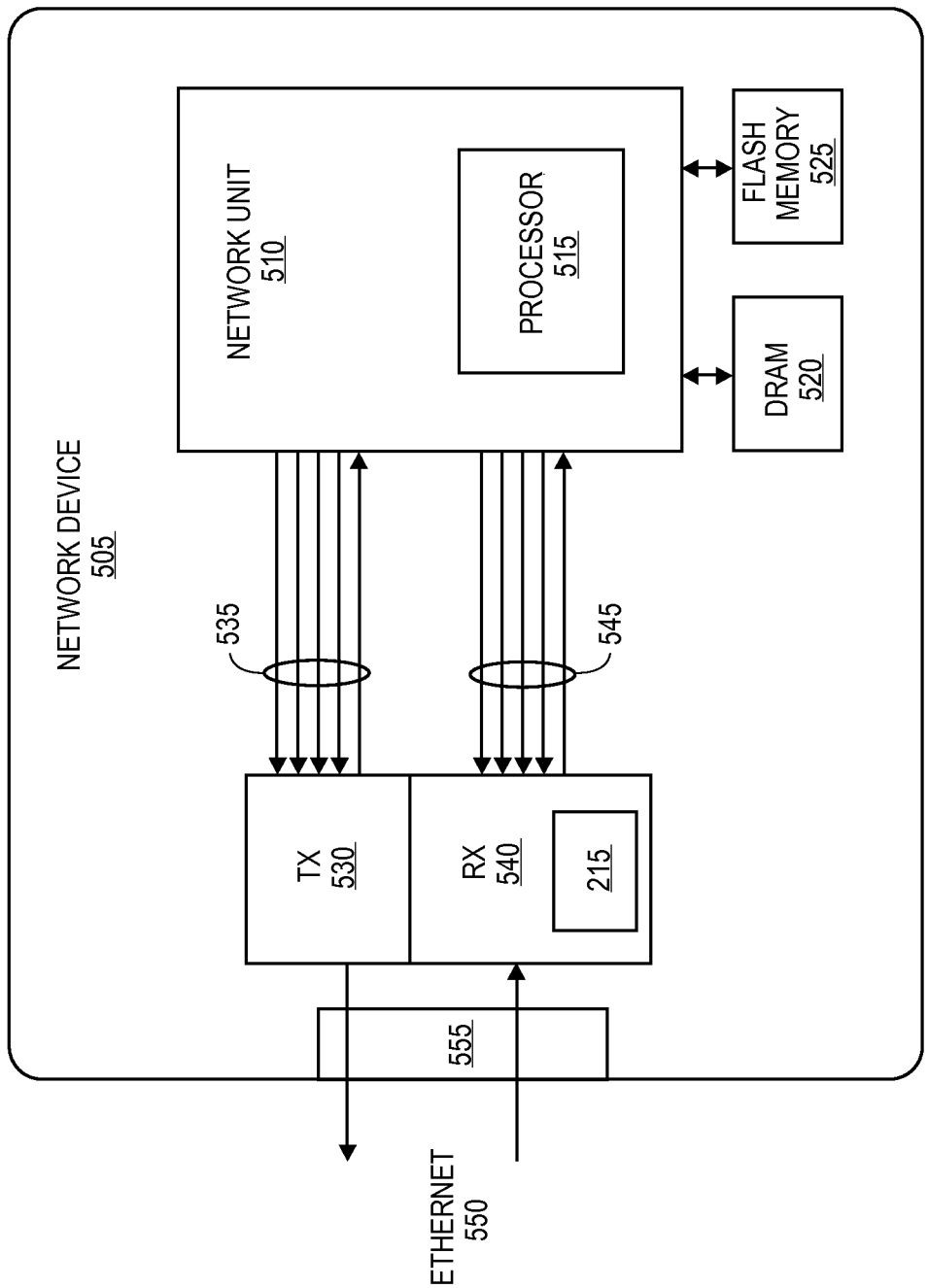
FIG. 5 illustrates a computing device capable of employing an embodiment of the invention.

FIG. 5 illustrates components of a network computer device 505 employing an embodiment of the present invention. In this illustration, a network device 505 may be any device in a network, including, but not limited to, a computing device, a network computing system, a television, a cable set-top box, a radio, a Blu-ray player, a DVD player, a CD player, an amplifier, an audio/video receiver, a smartphone, a Personal Digital Assistant (PGA), a storage unit, a game console, or other media device. In some embodiments, the network device 505 includes a network unit 510 to provide network functions. The network functions include, but are not limited to, the generation, transfer, storage, and reception of media content streams. The network unit 510 may be implemented as a single system on a chip (SoC) or as multiple components.

In some embodiments, the network unit 510 includes a processor for the processing of data. The processing of data may include the generation of media data streams, the manipulation of media data streams in transfer or storage, and the decrypting and decoding of media data streams for usage. The network device may also include memory to support network operations, such as Dynamic Random Access Memory (DRAM) 520 or other similar memory and flash memory 525 or other nonvolatile memory. Network device 505 also may include a read only memory (ROM) and or other static storage device for storing static information and instructions used by processor 515.

A data storage device, such as a magnetic disk or optical disc and its corresponding drive, may also be coupled to network device 505 for storing information and instructions. Network device 505 may also be coupled to an input/output (I/O) bus via an I/O interface. A plurality of I/O devices may be coupled to I/O bus, including a display device, an input device (e.g., an alphanumeric input device and or a cursor control device). Network device 505 may include or be coupled to a communication device for accessing other computers (servers or clients) via external data network. The communication device may comprise a modem, a network interface card, or other well-known interface device, such as those used for coupling to Ethernet, token ring, or other types of networks.

Network device 505 may also include a transmitter 530 and/or a receiver 540 for transmission of data on the network or the reception of data from the network, respectively, via one or more network interfaces 555. Network Device 505 may be the same as the communication media device 100 of FIG. 1, such as an amplifier, employing the dynamic audio/video synchronization mechanism 110 of FIG. 1. The transmitter 530 or receiver 540 may be connected to a wired transmission cable, including, for example, an Ethernet cable 550, a coaxial cable, or to a wireless unit. The transmitter 530 or receiver 540 may be coupled with one or more lines, such as lines 535 for data transmission and lines 545 for data reception, to the network unit 510 for data transfer and control signals. Additional connections may also be present. The network device 505 also may include numerous components for media operation of the device, which are not illustrated here.

Network device 505 may be interconnected in a client/server network system or a communication media network (such as satellite or cable broadcasting). A network may include a communication network, a telecommunication network, a Local Area Network (LAN), Wide Area Network (WAN), Metropolitan Area Network (MAN), a Personal Area Network (PAN), an intranet, the Internet, etc. It is contemplated that there may be any number of devices connected via the network. A device may transfer data streams, such as streaming media data, to other devices in the network system via a number of standard and non-standard protocols.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

One or more modules, components, or elements described throughout this document, such as the ones shown within or associated with an embodiment of a DRAM enhancement mechanism may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), EEPROM, magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
    a first media device having
    first logic to insert a signature in a first audio portion of an audio/video data stream to be transmitted to a second media device, wherein the signature represents uniquely identifiable data and the second media device comprises a display device;
    second logic to detect the signature in a second audio portion, the second audio portion received from the display device of the second media device;
    third logic to calculate latency of a path including the display device, wherein the third logic calculates the latency based on a difference between a time of detecting the signature in the second audio portion and a time of inserting the signature in the first audio portion; and
    fourth logic to synchronize the first audio portion with a video portion of the audio/video data stream based on the calculated latency.

2. The apparatus of claim 1, further comprising fifth logic to broadcast the synchronized audio/video data stream.

3. The apparatus of claim 1, wherein the first media device comprises one or more of an amplifier or an audio/video receiver.

4. The apparatus of claim 1, wherein the second media device further comprises a sink device coupled to the display device, wherein the sink device includes one or more of a television, a cinema display, a projector, a Digital Versatile Disk (DVD) player, a Blu-ray player, a computing device, a smartphone, a Personal Digital Assistant (PDA), and a game console.

5. The apparatus of claim 1, further comprising a third media device coupled to the first and second media devices over a network, the third media device including a source device that generates the audio/video data stream, wherein the third media device includes a network computing system, a cable set-top box, a cable headend, a satellite broadcasting system, a Blu-ray player, and a DVD player.

6. The apparatus of claim 5, wherein the network comprises one or more of a broadcasting network, a Local Area Network (LAN), a Wide Area Network (WAN), a Personal Area Network (PAN), a Metropolitan Area Network (MAN), an intranet, and an Internet.

7. A system comprising:
    a computing device having a memory to store instructions, and a first media device to execute the instructions, wherein the instructions cause the first media device to
    insert a signature in a first audio portion of an audio/video data stream to be transmitted to a second media device, wherein the signature represents uniquely identifiable data and the second media device comprises a display device;
    detect the signature in a second audio portion, the second audio portion received from the display device of the second media device;
    calculate latency of a path that includes the display device based on a difference between a time of detecting the signature in the second audio portion and a time of inserting the signature in the first audio portion; and
    synchronize the first audio portion with a video portion of the audio/video data stream based on the calculated latency.

8. The system of claim 7, wherein the instructions cause the first media device further to broadcast the synchronized audio/video data stream.

9. The system of claim 7, wherein the first media device comprises one or more of an amplifier or an audio/video receiver.

10. The system of claim 7, wherein the second media device comprises a sink device coupled to the display device, wherein the sink device includes one or more of a television, a cinema display, a projector, a Digital Versatile Disk (DVD) player, a Blu-ray player, a computing device, a smartphone, a Personal Digital Assistant (PDA), and a game console.

11. The system of claim 7, further comprising a third media device coupled to the first and second media devices over a network, the third media device including a source device that generates the audio/video data stream, wherein the third media device includes a network computing system, a cable set-top box, a cable headend, a satellite broadcasting system, a Blu-ray player, and a DVD player.

12. The system of claim 11, wherein the network comprises one or more of a broadcasting network, a Local Area Network (LAN), a Wide Area Network (WAN), a Personal Area Network (PAN), a Metropolitan Area Network (MAN), an intranet, and an Internet.

13. A method for synchronizing an audio and video portion, the method comprising:
    inserting a signature in a first audio portion of an audio/video data stream to be transmitted to a second media device, wherein the signature represents uniquely identifiable data and the second media device comprises a display device;
    detecting the signature in a second audio portion, the second audio portion received from the display device of the second media device;
    calculating latency of a path that includes the display device based on a difference between a time of detecting the signature in the second audio portion and a time of inserting the signature in the first audio portion; and
    synchronizing the first audio portion with a video portion of the audio/video data based on the calculated latency.

14. The method of claim 13, further comprising broadcasting the synchronized audio/video data stream.

15. The method of claim 13, wherein the first media device comprises one or more of an amplifier or an audio/video receiver.

16. The method of claim 13, wherein the second media device comprises a sink device coupled to the display device, wherein the sink device includes one or more of a television, a cinema display, a projector, a Digital Versatile Disk (DVD) player, a Blu-ray player, a computing device, a smartphone, a Personal Digital Assistant (PDA), and a game console.

17. The method of claim 13, wherein the first and second media devices are coupled to a third media device over a network, the third media device including a source device that generates the audio/video data stream, wherein the third media device includes a network computing system, a cable set-top box, a cable headend, a satellite broadcasting system, a Blu-ray player, and a DVD player.

18. The method of claim 17, wherein the network comprises one or more of a broadcasting network, a Local Area Network (LAN), a Wide Area Network (WAN), a Personal Area Network (PAN), a Metropolitan Area Network (MAN), an intranet, and an Internet.

* * * * *